United States Patent [19]
Javaloy et al.

[11] 3,733,653
[45] May 22, 1973

[54] DOSIFYING SAUSAGE MAKING MACHINE

[76] Inventors: Don Jose Manuel Javaloy; Don Jaime Prenafeta Garrusta, both of Nr. 306 Avenida Meridiana, Barcelona, Spain

[22] Filed: Nov. 27, 1970

[21] Appl. No.: 93,125

[30] Foreign Application Priority Data

June 11, 1970   Spain....................................374060
June 11, 1970   Spain....................................378890

[52] U.S. Cl............................................17/35, 17/33
[51] Int. Cl..............................................A22c 11/02
[58] Field of Search..............................17/35, 39, 33

[56] References Cited

UNITED STATES PATENTS 3,537,129   11/1970   Orloff et al...............................17/35
3,422,489   1/1969   Middleton................................17/35

FOREIGN PATENTS OR APPLICATIONS

593,429   2/1934   Germany..................................17/35
1,325,528   3/1963   France ....................................17/35

Primary Examiner—Lucie H. Laudenslager
Attorney—Denk. Paul M.

[57] ABSTRACT

In a machine for measuring and dispensing dosages of sausage or other meats, a hopper forces minced meat into a piston chamber, with said piston forcing said deposited meat into a pair of passages formed to either side of a partition which then forces the deposited meat out of one or alternately a pair of outlet funnels.

11 Claims, 7 Drawing Figures

Fig.1

DOSIFYING SAUSAGE MAKING MACHINE

BACKGROUND OF THE INVENTION

This invention relates generally to a meat dispensing, and more particularly, pertains to a meat dispensing machine which is useful for dispensing dosages of minced meat out of an outlet funnel or a pair of funnels.

Prior art sausage making apparatuses generally incorporate the standard principle of extrusion for simply dispensing increments of meat into a casing. Such sausage making apparatuses are useful for achieving their intended results, but they do not provide the speed that is needed in present day dosage dispensing machines that are used and required to process a large quantity of sausages, or the like, in a short period of time. The main object of this invention is to provide a meat dispensing apparatus which is continually operative, and incorporates either a single or pair of outlet funnels which are continually dispensing dosages of minced meat, or the like, for use in making sausages or related type food products.

Many of the objects of this invention will become more apparent to those skilled in the art in the light of the following description and accompanying drawings.

SUMMARY OF THE INVENTION

This machine comprises essentially a hopper that feeds meat to a cylinder which incorporates an impelling or thrust generating piston, and wherein a valve means disposed intermediate said hopper and the cylinder provides for alternate opening and closing of a passage therebetween, while simultaneously said valve provides for closing and opening of another passage between said cylinder to a dosage means for eventual discharge out of one or the other of outlet funnels. This opening or closing of this dual acting valve is dependent upon the forward movement of the thrusting piston. In addition, the co-ordinated action of the valve means is timed to operate in unison with the positioning of a partition provided in said dosage means and which is disposed within the passage leading from said piston chamber to the single or dual outlet funnels. This partition is also regulated to undertake, alternately, two positions in timed sequence with the forward nd return movements of the thrust piston. This partition functions as a portioning or dosage metering device, and it also acts in conjunction with the valve means so that depending upon the positioning of said valve and the partition, minced meat will be deposited within a pair of passages, one being formed to either side of said partition as it is positioned within the cylindrical housing of the dosage means, and that as minced meat is deposited within one passage, and this passage is turned into communication with one of the outlet funnels, the meat filling up the other passage urges the partition forward, causing the thrusting of said first deposited meat out of the proximate outlet funnel. A position selector means is intergeared to said partition and the member in which it is mounted for sliding movement, so that said partition and means may be alternately turned a fixed number of degrees in timed sequence so that while one passage is in communication with one of the outlet funnels, the other passage will be in communication with the piston chamber to receive another dosage of minced meat for its eventual movement out of the other outlet funnel.

The valve means that acts in conjunction with the piston chamber, feeding hopper, and the passages of the partition means, comprises a linear disposed in close continuity within said cylinder, with an opening or passage being provided within one end of said liner and which may be turned into communication with an opening that provides movement of the meat into the aforesaid partition passages, while said liner is formed having another opening in its side wall that may confront the opening of the hopper to provide for passage of minced meat into the interior of the cylinder. Thus, these two liner openings are arranged for sequential operation, so that while the opening in the cylinder wall confronts the hopper opening, so as to allow meat to enter into the piston chamber, the opening in the end wall of said liner will be in closed position to prevent the forcing of meat into the outlet passages. Likewise, when this liner is rotated a fixed number of degrees, the opening in the wall that had been in communication with the hopper opening will be turned to provide for its closure, while the opening in the end wall of the cylinder liner will be in communication with an opening that leads into one of the passages of the dosage means and outlet funnels.

Around the periphery of the bottom portion of said liner there are provided integral teeth which function in the nature of a pinion and which are in communication with a rack that may be moved longitudinally by means of a piston and rod so as to provide for the timed and sequential turning of this valve like cylinder lining.

Another essential characteristic of this sausage making machine comprises the dosage generating device incorporating the partition as previously described, and this comprises a cylindrical formed housing incorporating a pivotal inverted U-shaped member in which the partition is seated for sliding movement, with said outlet passages being disposed to either side of said partition and being formed by said U-shaped member. This meat-moving element, or partition, is disposed within said cylindrical housing for alternate movement in two opposite directions, and said partition is moved by the thrust of the meat itself as it is deposited within one or the other of said formed passages created to either side of said partition. A pair of adjustable stops are formed in the upper portion of said cylindrical housing, and to either side of said partition, so as to limit the extent of movement of said partition.

In order to adjust the aforesaid stops, so that they act in conjunction with the cylindrical housing, a cover provided upon said cylindrical housing carries a helical wheel, which is geared to an endless screw, and which may be manually adjusted to provide for a regulation and positioning of said wheel and an associated disk which supports the depending stops that project into the interior of said cylindrical housing, one being disposed into each of the pair of passages that are formed to either side of the slidable partition.

To provide for a positioning of the U-shaped member, and its partition, as when it is desired to dispense a dosage of the meat from the two outlet funnels, a double acting cylinder incorporates a piston at each end which pistons are connected together by means of a geared rack. The gears of this rack engage with a pinion whose shaft is integral to the bottom wall of said U-member, so that upon the forcing of one or the other said pistons, in either direction, this will cause a displacement of its rack, and a turning of the engaged piston, so that the U-member and its partition will be turned a fixed number of degrees, generally approximately 90°. This turning of the U-member, as previously described, is timed with the sequential operation of the hopper and the thrusting piston contained within the meat carrying cylinder, so that after one of the passages to the side of said partition is filled with meat, the U-member of the cylindrical housing is turned approximately 90° so as to dispose this meat filled passage in communication with one of the outlet funnels, while at the same time the other passage is opened into communication with the now meat laden piston cylinder so that as this supply of meat is urged into said second passage, the partition will be urged forwardly to push the first quantity of meat out of the proximate outlet funnel.

The thrust piston which is contained within the cylinder is comprised of two concentric pistons, which, during a retracting of said piston during its return movement, one of said concentric pistons separates from the other and operates to allow creation of a vacuum within said cylinder so as to assist in drawing the minced meat down from its deposition within the hopper for reception within said chamber of the piston cylinder and fill the same. This joint movement of the concentric portions of this piston act with a pump to aspirate air that may be contained within the chamber of the piston cylinder, to create somewhat of a vacuum, and thereby draw the minced meat from the hopper in conjunction with the operation of a screw feet or helix contained within said hopper that is turned to force the meat downwardly into said piston chamber.

BRIEF DESCRIPTION OF THE DRAWINGS

In the drawings, FIG. 1 provides a side elevational view in section of the machine of this invention.

DESCRIPTION OF THE PREFERRED EMBODIMENT

Figure 1:
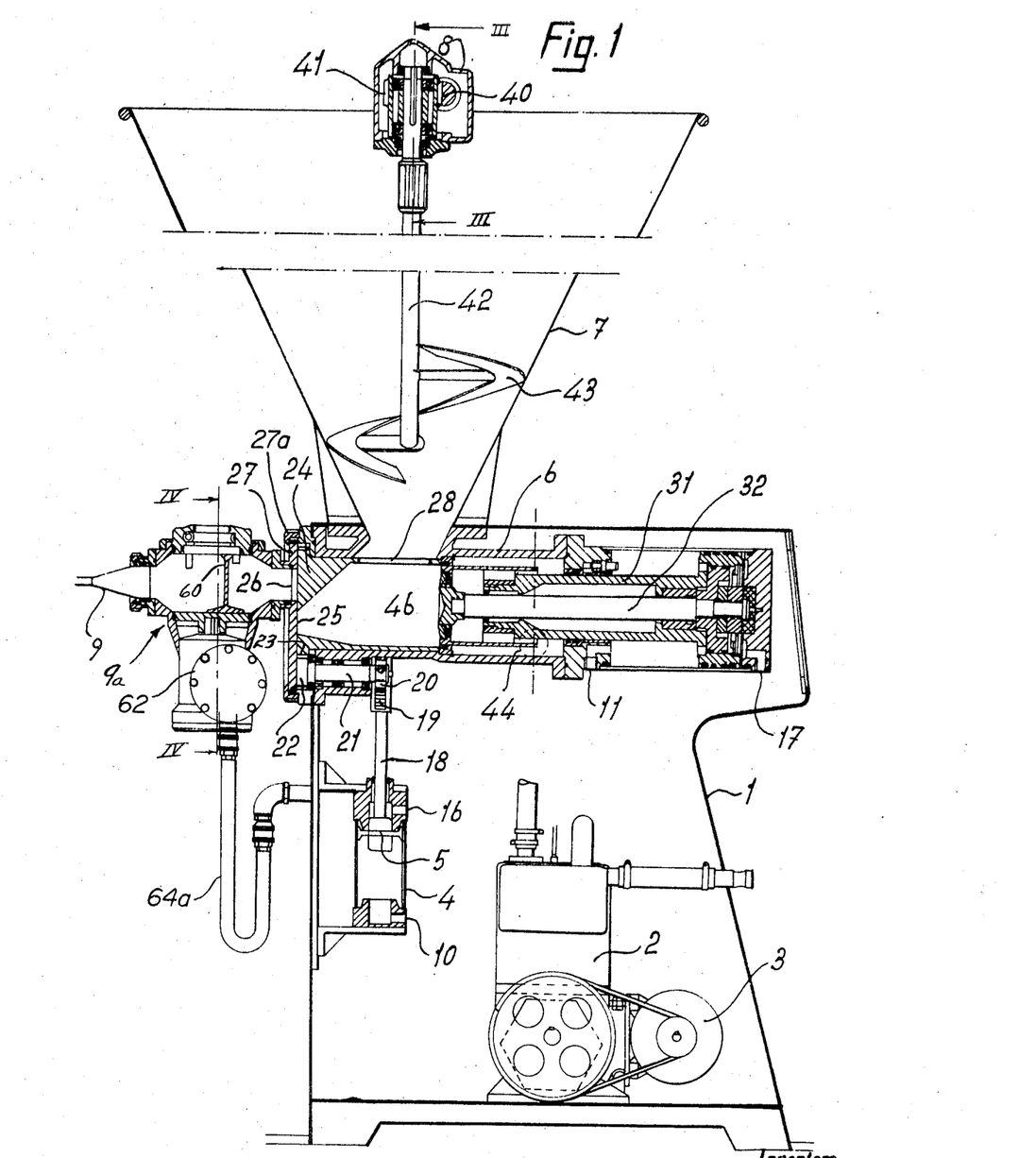
Figures 5, 6:
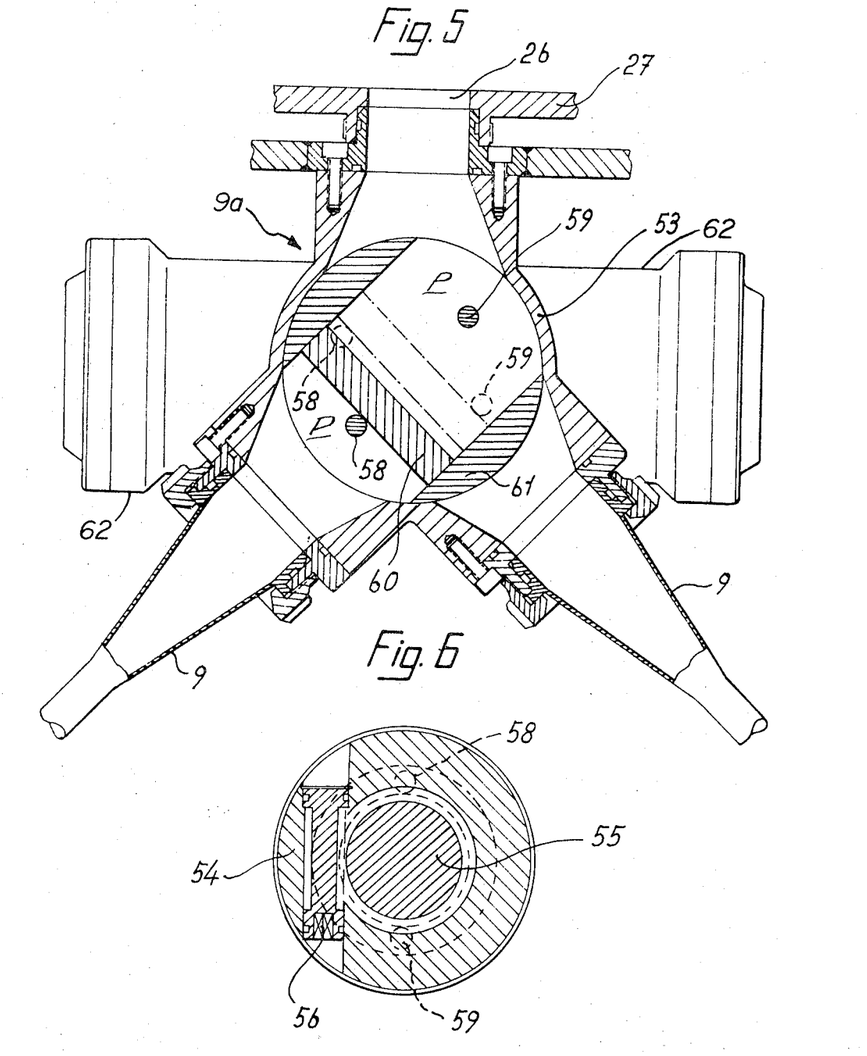
FIG. 5 is a top sectional view of the dosifier taken along the line V—V of FIG. 4.
FIG. 6 is a plan sectional view of the adjustment means for the partition stops taken along the line VI—VI of FIG. 4.

Referring now to the drawings, and in particular FIG. 1, there is shown the sausage making machine comprising a base structure 1, which has disposed within its framework a vacuum pump 2 that is driven by an electrical motor 3. A pneumatic cylinder 4 is also mounted within the base 1, and is provided with a piston 5 which is useful for actuating means for controlling the passage of dosages of minced meat through the machine, as will be hereinafter described. Mounted in the upward portion of the base 1 is a meat thrusting member or cylinder 6, which is disposed below a feed hopper 7 in which minced meat is disposed after its deposition from a feed meat disintegrator 8. To the front of the base structure 1 is provided an outlet funnel or a pair of them as shown in FIG. 5, which are in line with the meat thrusting member 6, and having the dosifier or proportional dispenser 9a disposed intermediate thereto.

Figure 3:
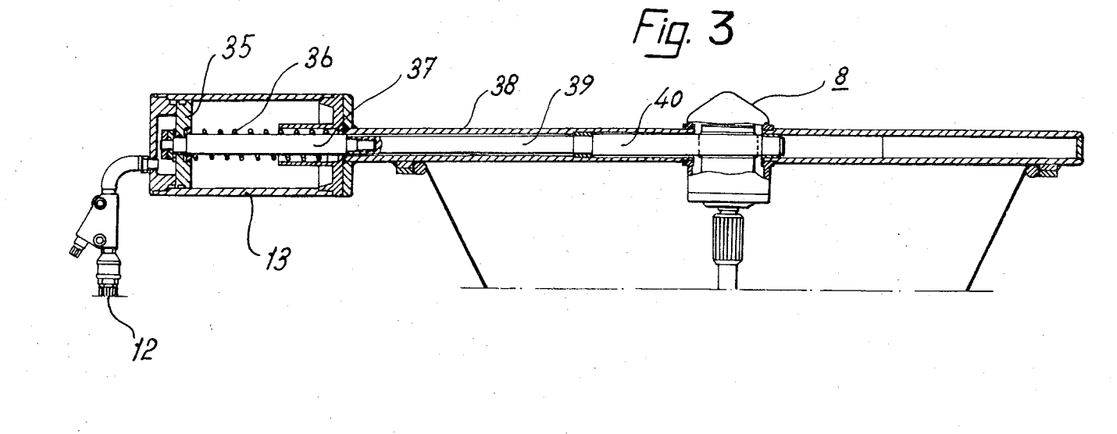
FIG. 3 is a longitudinal sectional view of the upper extremity of the feeding hopper taken along the line III—III of FIG. 1.

When this machine is set up for operation, and air under pressure is supplied to the machine, selector means (not shown) supplies air to the entrance 10, and to the interior of the cylinder 4, while simultaneously supplying air to the entrance 11 and into the interior of the cylinder body 6, in addition to supplying air under pressure to the entrance 12, see FIG. 3, for entrance to the interior of the cylinder 13 of the disintegrator 8. At this stage, the sausage making machine is prepared for operation.

Figure 2:
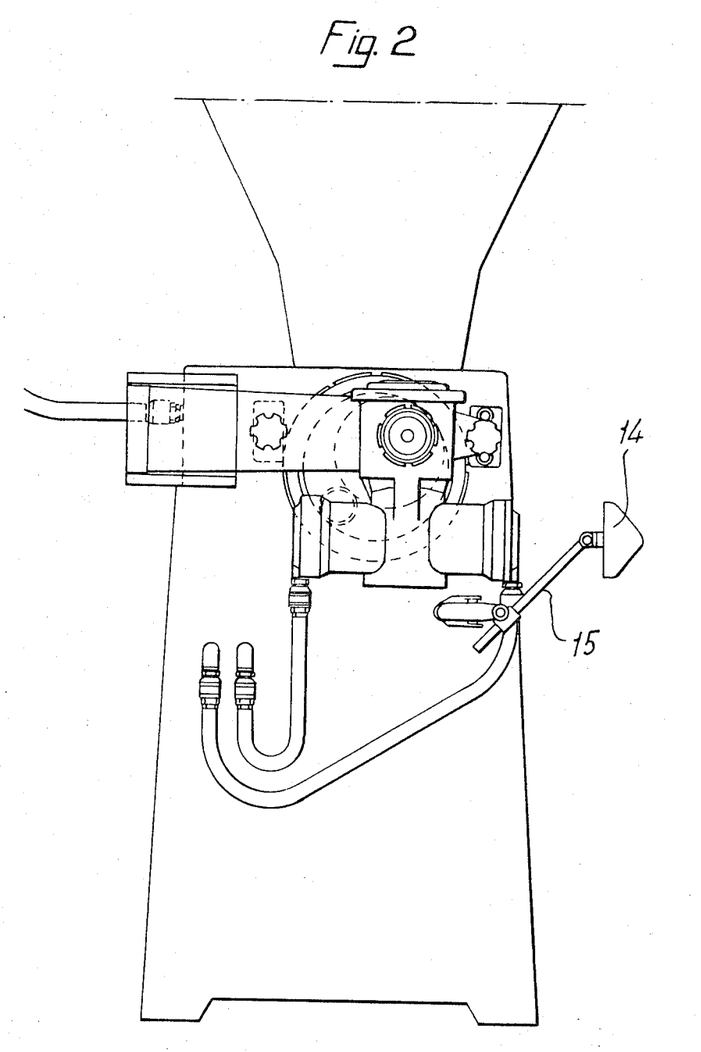
FIG. 2 is a front view of the invention.

To initiate a working cycle of this machine, and by referring also to FIG. 2, a control pedal 14 is depressed to actuate a lever 15, which seta a valve (not shown) that communicates with and provides for discharge or vacuuming of air from the passages of inlets 10, 11, and 12, while air under pressure is directed into the inlet 16 of the cylinder 4 so as to retract the piston 5 which descends to its lower end, while at this time air is directed into the passage 17 of the meat thrusting body 6.

At this stage of the operation of this sausage making machine, the piston 5, upon descending, retracts its connected rod 18, which in turn draws the rack 19. The movement of this rack 19 turns a pinion 20 that is mounted integrally upon a shaft 21, while such shaft at its other end carries another pinion 22 which is intergeared with the teeth 23 that are formed peripherally in the bottom of a valve like liner 24 that is disposed the forward portion of the cylinder body 6. This liner 24, at one end wall, is aligned in a discharged position with the orifice 26 formed in the cover plate 27 of the machine. This cover 27 is mounted fixed by means of retaining ring 27a, to the cylinder supported upon the base of the machine and has mounted thereto the dosifier portion 9a of this machine, in addition to its one or pair of outlet funnels 9. It is to be noted that the dosifier and cover plate 27 mount by means of said retaining ring to the opening 26 of the cover plate. There is another opening 28 provided in the side wall of the liner 24, which may be operatively disposed in open communication with the bottom of the hopper 7, which occurs only when the openings 25 and 26 are not aligned, so as to preclude passage of minced meat therethrough while the hopper fills the liner and cylinder with meat. This occurs when the piston 5 has been moved to the upward portion of its cylinder 4, and the opening 28 in the wall of the liner coincides with the bottom of the hopper 7, so as to allow meat to pass into the liner, and likewise, when the piston 5 is at the lowest point within its cylinder 4, this opening 28 will be closed, and the orifices or openings 25 and 26 coincide to pass meat to the dosifier.

Immediately after the piston 5 has descended within its cylinder 4, air enters through the port 17 and is impressed upon the concentric pivots 29 and 30 which are displaced forwardly within the interior of this thrusting body 6, and through the agency of their respective rods 31 and 32, move the concentric pistons 33 and 34 forwardly together in order to force the meat disposed within the liner out through aligned openings 25 and 26, thereby unloading the machine and filling the dosage means.

While the pistons 33 and 34 are moving forward, the pressurized air is discharged from a cylinder 13 out a conduit 12, so that the piston 35 is urged under the bias of the spring 36, surrounding the rod 37, to its normally rearward disposition in said cylinder. This cylinder 13 is mounted to one end of a tubular guide support 38, that rest diametrically across the upper opening of the hopper 7, and within said guide 38 inserts the one end of said rod 37 that is connected with a cylindrical bar 39 upon which a toothed rack 40 is formed. During displacement of this rack, a pinion 41 is rotated which effects a turning of a shaft 42 that supports a helical screwdrive 43 that is pendently disposed within the hopper 7. Upon a turning of this drive, in one direction, the minced meat within the hopper is forced downwardly towards the thrusting cylinder member 6.

The previously described stage of operation of this sausage making machine is accomplished while the control pedal 14 is depressed, and, immediately upon the release of said pedal, any further forward advancement of the thrusting piston 33 and 34 is discontinued since air no longer enters into the port 17 of the thrusting member 6. At this instance the position of the selector valve of the air delivery means of the machine is changed to change the cycle of operation of the machine.

Upon initiation of the return stage of the machine, air is allowed to enter into the passage 10 of the cylinder 4, thereby forcing the piston 5 to ascend, in addition to its rod 18 and rack 19, which rack effects a turning of the liner 24 so as to position the orifice 25 out of alignment and communication with the opening 26. At the same time, the opening 28 within the wall of the liner 24 is placed into communication with the hopper 7 in order to take in another load of minced meat into said liner. At this moment, air is allowed to enter the port 11 so that the piston 30 and its rod 32, and the piston 34, will be caused to reverse, or move to the right as shown in FIG. 1, until said piston 30 comes to rest upon the projection ring 45 of the piston 29. At this instance, the vacuum initiated through the passage 44 from the pump 2 creates a suction within the chamber 46, which is generated through its communication with the passages 47, 48, and 49, with the result that said vacuum formed in the chamber 46 induces the minced meat contained within the hopper 7 to descend into said chamber 46, to become compacted therein, through the assistance of the rotation of the feed screw or helix 43.

This return stroke of the piston 30 continues until its rod 32, at its rearward extremity 50, rests against the elastic or cushioning stopper 51, which is fixed by means of a screw to the back wall of the cylinder 6. In addition, the air entering the port 11 continues to act on the piston 29 which continues to retract until its extremity 52 as formed on the backside of its rod 31 comes to rest against the piston 30. At this moment, the piston components 33 and 34 form a unified piston, thereby eliminating the entrance of any further vacuuming effect within the chamber 46, and which prevents the entrance of any particles of meat between said concentric pistons 33 and 34.

To increase the usefulness of this sausage making machine, the dosifying device 9a may be situated intermediate the cover plate 27 and the outlet funnels 9, as shown in FIG. 5, which dosifying device comprises a cylindrical housing 53 which is in open communication with the opening 26 of the cover 27, and also communicates with the outlets 9. This dosifyer may be formed having one or two outlet funnels depending upon the capacity sausage making machine desired.

Figure 4:
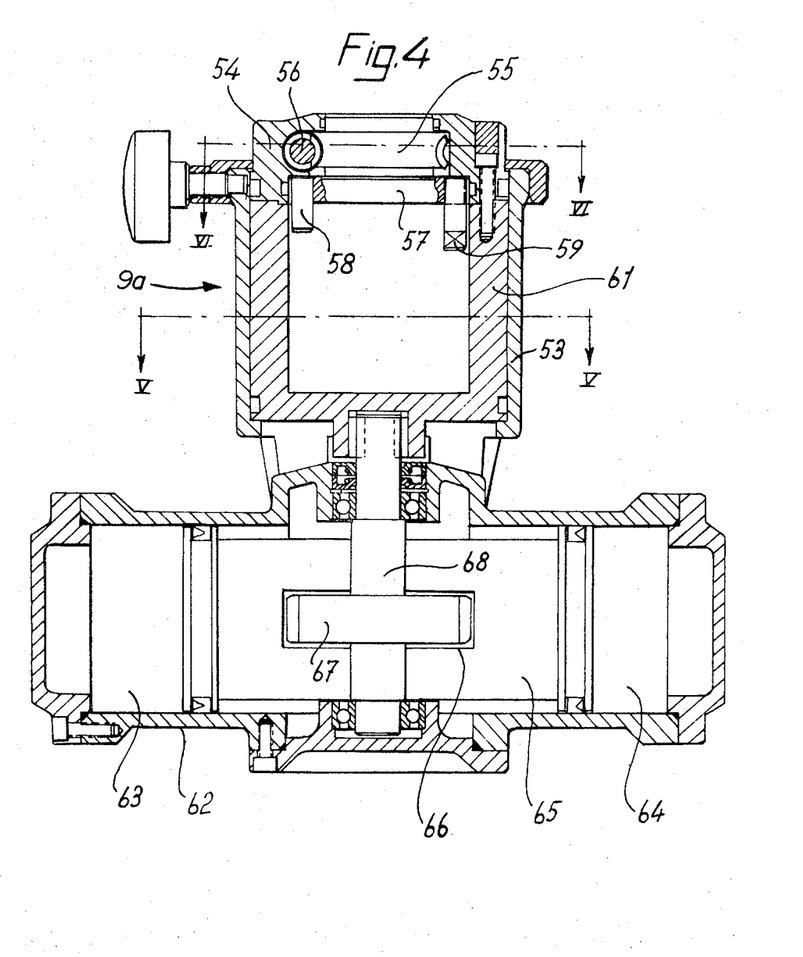
FIG. 4 is a vertical section taken through the cylindrical housing and dual acting pistons taken approximately along the line IV—IV of FIG. 1.

By referring to FIG. 4, the cylindrical member 53 is provided with an upward cover 54 which has formed therein an opening which mounts a peripherally threaded wheel 55 that is engaged by a endless screw 56 which may be manually driven to regulate the positioning of said threaded wheel, and at the same time, a supported disk 57 connecting to said wheel 55 that is disposed interiorly of said cover. This disk carries a pair of stops 58 and 59, which through the adjustment of the wheel 55 may be turned to provide for a setting of the stops and the capacity of meat to be dispensed in doses from this sausage making machine. Therefore, the object of these stops is to set the length of displacement or movement of a partition 60 which is shifted within an inverted U-shaped member 61 through the force of the driven meat. This U-shaped member 61 is disposed for allowing the operation of a reciprocating movement to this partition 60 as when the meat under pressure is forced by means of the thrusting member 6 against said partition. It can be seen, as in FIG. 5, that there are passages P formed to either side of the partition 60 as it is disposed within the member 61, and it is into these passages that the meat under pressure is forced by means of the thrusting movement of the piston of member 6.

This U-shaped member 61, and its partition 60, is disposed for a limited degree of pivoting within the cylindrical member 53, and the degree of turning that is usual for the purposes of this invention where two outlet funnels are employed is approximately 90°. Where only one outlet funnel is employed, the partition and U-member may be turned approximately 180°. To achieve this limited degree of turning, a pneumatic cylinder 62, FIGS. 4 and 5, contains double acting pistons 63 and 64, which are joined together by a bridging member 65 which mounts a toothed rack 66. This rack 66 is geared with a pinion 67 that is integral with a shaft 68 that extends upwardly and is rigidly fixed to the underside of said U-shaped member 61. Upon displacement of the pistons 63 and 64, the rack forces a degree of turning to the pinion 67, which in effect causes a slight turning to the shaft 68 and approximately a 90° turn in the location of the U-shaped member 53. Obviously, as the piston 63 and 64 are moved, and it can be seen from FIG. 1 that an air line 64a connects to either side of these pistons to effect their timed movement, the member 61 may be reciprocated between approximately 90° pivots or between 180° pivots when only one outlet funnel 9 is used.

As seen in FIG. 5, there are two outlet funnels that are mounted to this particular sausage making machine. On the other hand, it should be understood that this machine can operate only one outlet funnel. But, when two funnels are employed, the meat forced through the opening 26 enters into the one passage P disposed to the one side of he partition 60. Then, through the operation of the pneumatic cylinder 62, the member 61 is rotated approximately 90° so that this meat filled passage will become disposed and in open communication with the right side outlet funnel 9. Then, through the timed sequence of operation of the thrusting member 6, additional meat under pressure is forced through the opening 26 and into the passage P disposed upon the other side of the partition 60, and the force of this entering meat causes the partition 60 to be displaced from the stop 58 towards the stop 59, thereby forcing the meat disposed within this first passage out of said right side funnel 9. While this was occuring, obviously meat is becoming compacted and filled within this other passage. As the partition 60 comes to rest against the stop 59, the pneumatic cylinder 62 is once again operated, to effect a 90° turn back, so that the other passage which is now filled with meat becomes disposed in open communication with the left side outlet funnel 9. When this occurs, meat under pressure once again is forced by means of the thrusting member 6 out of the opening 26 and into the near emptied first passage P, thereby forcing the partition 60 in a direction towards the stop 58. Under this action, the meat disposed in this second passage is forced out of said left side outlet funnel 9. Thus, it can be seen that this routine may be repeated as many times as desired so as to provide a continuous and constant alternate dispensing of portions of meat out of the respective left side and right side outlet funnels 9.

Figure 7:
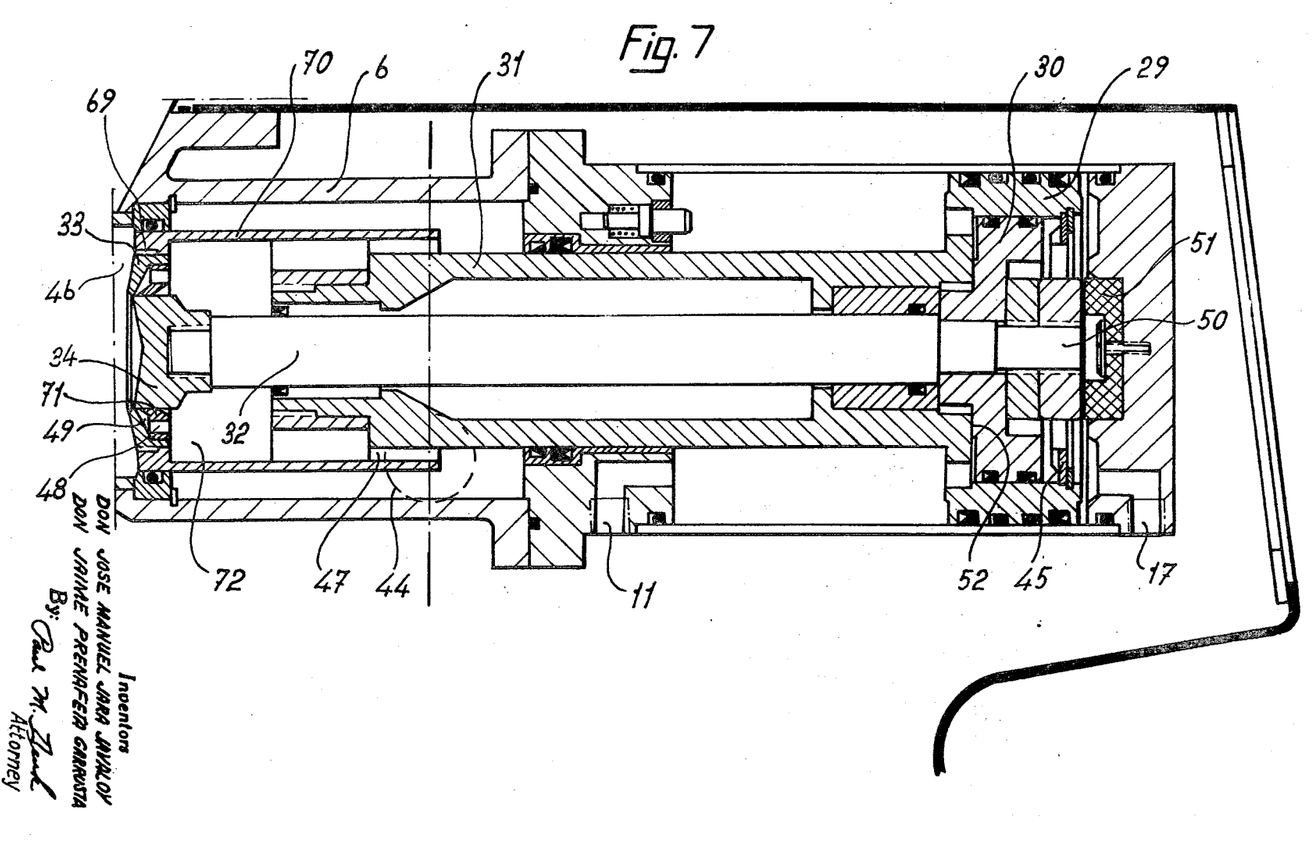
FIG. 7 provides an enlargement of the longitudinal sectional view of the thrusting piston as disclosed in FIG. 1.

To furnish a little more detail about the thrusting cylinder member 6, as disclosed in FIG. 7, the assembly of pistons are therein shown. The relationship between the concentric pistons 33 and 34 is shown closed, and piston 33 is shown being threaded, as at 69, to the intermediate sleeve 70, which is connected to its rod 31. It is possible through this threaded relationship that the piston 33 may be regulated in its positioning with respect to its central piston 34, so as to provide adjustment in the disposition of these two pistons. The piston 34 forms the head portion of the rod 32, and this piston is guided in its movement by means of its close tolerance fitting within the annular piece 71 that is threaded interiorly of the piston head 33. The passages 48 formed within this annular piece 71 allows for the entrance of the vacuuming effect from the chamber 72, as has been previously described.

Numerous variations in the construction of this sausage making machine, within the scope of the appended claims, will occur to those skilled in the art in the light of the foregoing disclosure. As previously described, it is possible that this machine can be used with only one outlet funnel, in place of the two funnels, as has been so thoroughly described in this application. The described embodiment is merely illustrative.

Having thus described the invention, what is claimed and desired to be secured by Letters Patent is:

1. A sausage making machine comprising a feeding hopper arranged for holding a supply of meat, a thrusting piston, a cylinder operatively incorporating said piston and being in communication with said hopper and capable of receiving a quantity of its retained meat, an outlet funnel connecting to said cylinder, a dosifying means operatively associated with said cylinder and funnel and arranged for receiving some of the meat as it is urged out of said cylinder through the operation of its piston while simultaneously dispensing some previously received meat out of the outlet funnel, a slidable partition member disposed within said dosifying means and forming passages to either of its sides for sequentially receiving and dispensing a quantity of meat, means associated with said dosifying means to establish its setting in sequence with the disposition of said thrusting piston, valve means operatively disposed within said cylinder and upon actuation providing for the alternate opening of the passage between the hopper and the cylinder, and the cylinder and he outlet funnel, in timed relation with the movements of said piston.

2. The sausage making machine of claim 1 wherein said valve means comprises a liner having a cylindrical wall in contiguity within the cylinder and incorporating an integral end wall, one of said passages being provided through said cylindrical wall and capable of being arranged in open communication with the feeding hopper, another of said openings provided through said end wall, a cover plate connected intermediate said outlet funnel and cylinder and having an orifice provided therethrough and capable of confronting the opening of said end wall to provide communication between said cylinder and outlet funnel, gear means formed upon the periphery of said liner, and means for operating said gear means to effect rotation of said liner and alternating the communication said cylinder the openings between the hopper and liner, and the end wall and outlet funnel.

3. The sausage making machine of claim 2 wherein the opening provided through the end wall and the opening provided through the cover plate are off centered with respect to the longitudinal axis of said liner so that said liner can be rotated to effect open communication between said openings and further rotated to preclude passage from said cylinder into the outlet funnel.

4. The invention of claim 2 wherein threaded means mounts said cover plate to one end of said cylinder.

5. The invention of claim 2 wherein said outlet funnel is retained to said dosifying means, and said dosifying means is retained to said cover thereby aligning the outlet funnel concentrically with the disposition of said orifice provided through said cover plate.

6. The invention of claim 2 and further including a threaded ring engaging the side of orifice provided through said cover plate, said outlet funnel being mounted to said cylinder and cover plate through its threaded engagement with said ring.

7. The invention of claim 1 wherein a pair of outlet funnels communicating with said cylinder, said dosifying means alternating its setting with respect to each outlet funnel to effect dispensing of meat alternately out of each outlet funnel upon each stroke of said thrusting piston as it urges meat out of said cylinder and into said dosifying means.

8. The invention of claim 1 wherein said means connecting with said dosifying means comprises a cylindrical housing, an inverted U-shaped member disposed for pivoting within said housing, said partition member having formed passages to either of its sides disposed for limited sliding movement within said U member, whereby the forceful depositing of meat within one of said passages through the urging of said thrusting piston effects the dispensing of meat previously disposed within said other passage out of the aligned outlet funnel.

9. The invention of claim 8 and further characterized by a cover disposed upon the upper portion of said cylindrical housing, an endless screw mounting said cover to said cylindrical housing, a helical wheel geared with said endless screw and upon turning providing for the turning of said cover, a pair stops depending from said cover, one of said stops being disposed within each of aid formed passages to either side of said slidable partition, whereupon the turning of said helical wheel said stops may be adjusted to fix the limit of sliding movement of said partition.

10. The invention of claim 7 wherein said means connecting with said dosifying means to establish its setting in sequence with the movements of said piston comprising a pair of pistons enclosed in a double acting cylinder, said pistons being joined together by a rack, a pinion disposed for intergearing with said rack, a shaft mounting to said pinion at one end, with the other end of said shaft being connected with said pivotal U-member, and whereupon the actuation of said double acting piston providing for the alternate setting of said U-member and partition formed passaged with respect to said outlet funnels and the opening to said thrusting piston cylinder.

11. The invention of claim 1 wherein said thrusting piston comprises a double piston, said double piston having a central piston connecting to an interior rod, an outer concentric piston surrounding said central piston and being integral with a tubular outer rod, said central piston capable of being withdrawn partially from said outer piston to provide evacuation of air from sad cylinder during the deposition of a quantity of meat from said hopper into said cylinder.

* * * * *